(12) United States Patent
Kajiura et al.

(10) Patent No.: US 10,644,334 B2
(45) Date of Patent: May 5, 2020

(54) FUEL CELL SYSTEM

(71) Applicant: TOYOTA JIDOSHA KABUSHIKI KAISHA, Toyota-shi, Aichi-ken (JP)

(72) Inventors: Ryo Kajiura, Nagakute (JP); Kenji Umayahara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 323 days.

(21) Appl. No.: 15/630,090

(22) Filed: Jun. 22, 2017

(65) Prior Publication Data
US 2017/0373333 A1  Dec. 28, 2017

(30) Foreign Application Priority Data

Jun. 27, 2016  (JP) ................ 2016-126961

(51) Int. Cl.
| H01M 8/04298 | (2016.01) |
| H01M 8/04858 | (2016.01) |
| H01M 8/04746 | (2016.01) |
| H01M 8/04082 | (2016.01) |
| H01M 16/00 | (2006.01) |
| H01M 8/04089 | (2016.01) |
| H01M 8/0297 | (2016.01) |

(52) U.S. Cl.
CPC ..... *H01M 8/04298* (2013.01); *H01M 8/0297* (2013.01); *H01M 8/04089* (2013.01); *H01M 8/04201* (2013.01); *H01M 8/04753* (2013.01); *H01M 8/04917* (2013.01); *H01M 16/006* (2013.01); *H01M 2220/20* (2013.01); *H01M 2250/20* (2013.01); *Y02T 90/32* (2013.01)

(58) Field of Classification Search
CPC .............................................. H01M 8/04298
See application file for complete search history.

(56) References Cited

FOREIGN PATENT DOCUMENTS

JP   2015-220961   12/2015

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

An MG-ECU obtains a rotational speed Na of an ACP. The MG-ECU transmits the obtained rotational speed (a PM reception rotational speed) Na of the ACP to a PM-ECU through communication. The PM-ECU obtains a rotational speed predicted value Np by adding a rotational speed change width Cvw to the PM reception rotational speed Na received from the delayed MG-ECU. A limit torque Trl2 is obtained through the use of the obtained rotational speed predicted value Np and an ACP permissible power level line L1.

4 Claims, 6 Drawing Sheets

FUEL CELL SYSTEM

INCORPORATION BY REFERENCE

The disclosure of Japanese Patent Application No. 2016-126961 filed on Jun. 27, 2016 including the specification, drawings and abstract is incorporated herein by reference in its entirety.

BACKGROUND

1. Technical Field

The disclosure relates to a fuel cell system.

2. Description of Related Art

In recent years, fuel cell-powered vehicles that use a fuel cell and a secondary battery as electric power sources have been drawing attention (e.g., see Japanese Patent Application Publication No. 2015-220961 (JP 2015-220961 A)). The air supplied to the fuel cell is taken in from outside air and force-fed by an in-vehicle air compressor (which will be referred to hereinafter as an ACP). The rotational speed of a motor built into the air compressor as a drive source thereof is controlled in accordance with the operating state of the fuel cell, and the amount of air supplied to the fuel cell is adjusted.

SUMMARY

FIG. 5 is a view for illustrating a method of adjusting an amount of air by an ACP according to the related art. A fuel cell system is equipped with an FC electric power source 100 and a battery electric power source 200. The FC electric power source 100 is equipped with a fuel cell 10 and a step-up converter (which will be referred to hereinafter as an FC converter) 20. The battery electric power source 200 is equipped with a battery 30 and a step-up converter (which will be referred to hereinafter as a battery converter) 40. The electric power supplied from the FC electric power source 100 and/or the battery electric power source 200 is supplied to an ACP 400 and the like via an inverter 300. The driving of the ACP 400 and the inverter 300 is controlled by a control unit 500.

The control unit 500 is configured to include an MG-ECU 501, a PM-ECU 502 and an FC-ECU 503. The MG-ECU 501 acquires a signal $S\theta$ indicating an electric angle $\theta$ from the inverter 300 through communication, and obtains a rotational speed Na of the ACP 400 from a moving amount of the electric angle $\theta$. The MG-ECU 501 transmits the obtained rotational speed Na of the ACP 400 to the PM-ECU 502 through communication.

The PM-ECU 502 obtains a limit torque Trl1 through the use of the received rotational speed Na and a map indicating a permissible power (which will be referred to hereinafter as an ACP permissible power map) Mp or the like. On the other hand, the FC-ECU 503 obtains a rotational speed command value Crpm based on an accelerator depression amount detected by an accelerator position sensor or the like, and supplies the obtained rotational speed command value Crpm to the PM-ECU 502. The PM-ECU 502 obtains a command torque Trc1 based on the rotational speed command value Crpm supplied from the PM-ECU 502, and then compares the obtained command torque Trc1 with the limit torque. When the obtained command torque Trc1 is smaller than the limit torque Trl1, the PM-ECU 502 directly outputs the command torque Trc1 to the MG-ECU 501. On the other hand, when the obtained command torque Trc1 is larger than the limit torque Trl1, the PM-ECU 502 reduces the command torque Trc1 to the limit torque Trl1, and outputs this limit torque Trl1 to the MG-ECU 501 as the command torque Trc1. The MG-ECU 501 controls the driving of the ACP 400 by calculating a current command value Ic based on the given command torque Trc1, and supplying the calculated current command value Ic to the inverter 300.

By the way, in the aforementioned configuration, the MG-ECU 501 transmits the obtained rotational speed Na of the ACP 400 to the PM-ECU 502, but a delay is caused in communication from the MG-ECU 501 to the PM-ECU 502 (which will be referred to hereinafter as a communication delay). The main cause of this communication delay is considered to be a deviation generated between a timing of data transmission by the MG-ECU 501 (e.g., a cycle of 8 (milliseconds)) and a timing of data reception by the PM-ECU 502 (e.g., a cycle of 16 (milliseconds)). Accordingly, in the case where an operation of raising the rotational speed Na of the ACP 400 is performed, for example, when a vehicle suddenly starts moving etc., the rotational speed (which will be referred to hereinafter as a PM reception rotational speed) Na delivered to the PM-ECU 502 from the MG-ECU 501 is lower than an actual rotational speed (which will be referred to hereinafter as an actual MG rotational speed) Nr at that moment (e.g., see FIG. 6), due to the occurrence of the above-mentioned communication delay.

As described previously, in the configuration of FIG. 5, the limit torque Till is determined by the PM-ECU 502 through the use of the PM reception rotational speed Na and the ACP permissible power map Mp. However, a desired limit torque is not obtained when the PM reception rotational speed Na is deviant from the actual MG rotational speed Nr. For example, when the vehicle suddenly starts moving, the PM reception rotational speed Na in the PM-ECU 502 is lower than the actual MG rotational speed Nr, so the limit torque Trl1 determined by the PM-ECU 502 is large. As a result, the limit torque Trl1 that does not fall within an ACP permissible power Pal is set. Thus, in the PM-ECU 502, as shown in FIG. 6, a torque corresponding to an excess power Pex exceeding the ACP permissible power Pal is output to the MG-ECU 501 as the command torque Trc1. Eventually, a surplus power is additionally supplied to the battery 30, and the battery 30 is overloaded. This problem has been pointed out.

The disclosure provides a fuel cell system capable of restraining a command torque corresponding to an excess power exceeding a permissible power to an air compressor from being generated, by using a predicted value of a rotational speed of the air compressor. More specifically, the disclosure provides a fuel cell system capable of generating a command torque Trc2 corresponding to an appropriate power that falls within the ACP permissible power Pal, by obtaining a rotational speed predicted value Np that is closer to the actual MG rotational speed Nr than in the system of FIG. 5, and obtaining a limit torque Trl2 through the use of the obtained rotational speed predicted value Np and an ACP permissible power level line L1 (see FIG. 4, which will be described later).

An aspect of the disclosure relates to a fuel cell system. The fuel cell system is equipped with a fuel cell, a battery, an inverter to which the fuel cell and the battery are connected in parallel, an air compressor that is connected to the inverter, and a control unit that controls driving of the air compressor by a current command value supplied to the inverter. The control unit is equipped with a first control unit that controls driving of the air compressor, and a second control unit that controls an electric power of the system.

The first control unit obtains a rotational speed of the air compressor based on a signal supplied from the inverter, transmits the rotational speed to the second control unit, and controls the current command value supplied to the inverter based on a command torque transmitted from the second control unit. The second control unit receives the rotational speed from the first control unit, receives a rotational speed command value of the air compressor corresponding to an output requirement of the fuel cell from an outside, obtains a rotational speed predicted value based on the received rotational speed command value, derives a limit torque of the air compressor from the obtained rotational speed predicted value, generates the command torque of the air compressor within a range of the derived limit torque, and transmits the generated command torque to the first control unit.

According to this configuration, the rotational speed predicted value that is closer to an actual rotational speed than in the system of FIG. 5 is obtained, and the limit torque is obtained from the obtained rotational speed predicted value. An appropriate command torque is generated by guarding the command torque such that the command torque does not exceed the limit torque thus obtained, and the driving of the air compressor is controlled. In consequence, the problem of the system of FIG. 5 can be restrained from being caused. This problem consists in that a power that does not fall within the ACP permissible power is output due to the generation of an excessive command torque and the battery is overloaded due to the generation of a surplus power.

The second control unit may calculate a permissible electric power of the air compressor based on an electric generation target electric power of the fuel cell, and derive the limit torque based on the rotational speed predicted value and the permissible electric power of the air compressor.

As described hitherto, a command torque corresponding to an appropriate power that definitely falls within the ACP permissible power can be generated by calculating the ACP permissible power in consideration of the electric generation target electric power of the fuel cell and the like and calculating the limit torque based on the rotational speed predicted value and the ACP permissible power.

The second control unit may calculate a steady torque based on the rotational speed command value, derive a rotational speed change width through use of the calculated steady torque and a last value of the command torque transmitted to the first control unit one cycle ago, and obtain the rotational speed predicted value by adding the rotational speed to the derived rotational speed change width.

As described hitherto, the rotational speed predicted value that is closer to the actual MG rotational speed at the moment can be obtained by deriving the rotational speed change width through the use of the steady torque needed to maintain the rotational speed at the moment and the last value of the command torque, and obtaining the rotational speed predicted value from the derived rotational speed change width and the received rotational speed.

Besides, the fuel cell system may be further equipped with a third control unit that controls electric generation of the fuel cell. The third control unit may obtain an output requirement of the fuel cell based on a signal indicating an input accelerator depression amount, generate the rotational speed command value of the air compressor in accordance with the obtained output requirement, and transmit the generated rotational speed command value to the second control unit.

As described hitherto, the output requirement of the fuel cell can be accurately obtained through the use of the signal indicating the accelerator depression amount. However, it goes without saying that the method of obtaining the output requirement of the fuel cell is not limited to the signal indicating the accelerator depression amount, and that the values of other parameters may be used.

The disclosure makes it possible to restrain a command torque corresponding to an excess power exceeding a permissible power to an air compressor from being generated, by obtaining a predicted value of a rotational speed of the air compressor.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The embodiment of the disclosure will be described hereinafter in detail with reference to the drawings. It should be noted, however, that the scope of the disclosure is not limited to this embodiment thereof.

A. Present Embodiment

[Configuration of Fuel Cell System]

Figure 1:
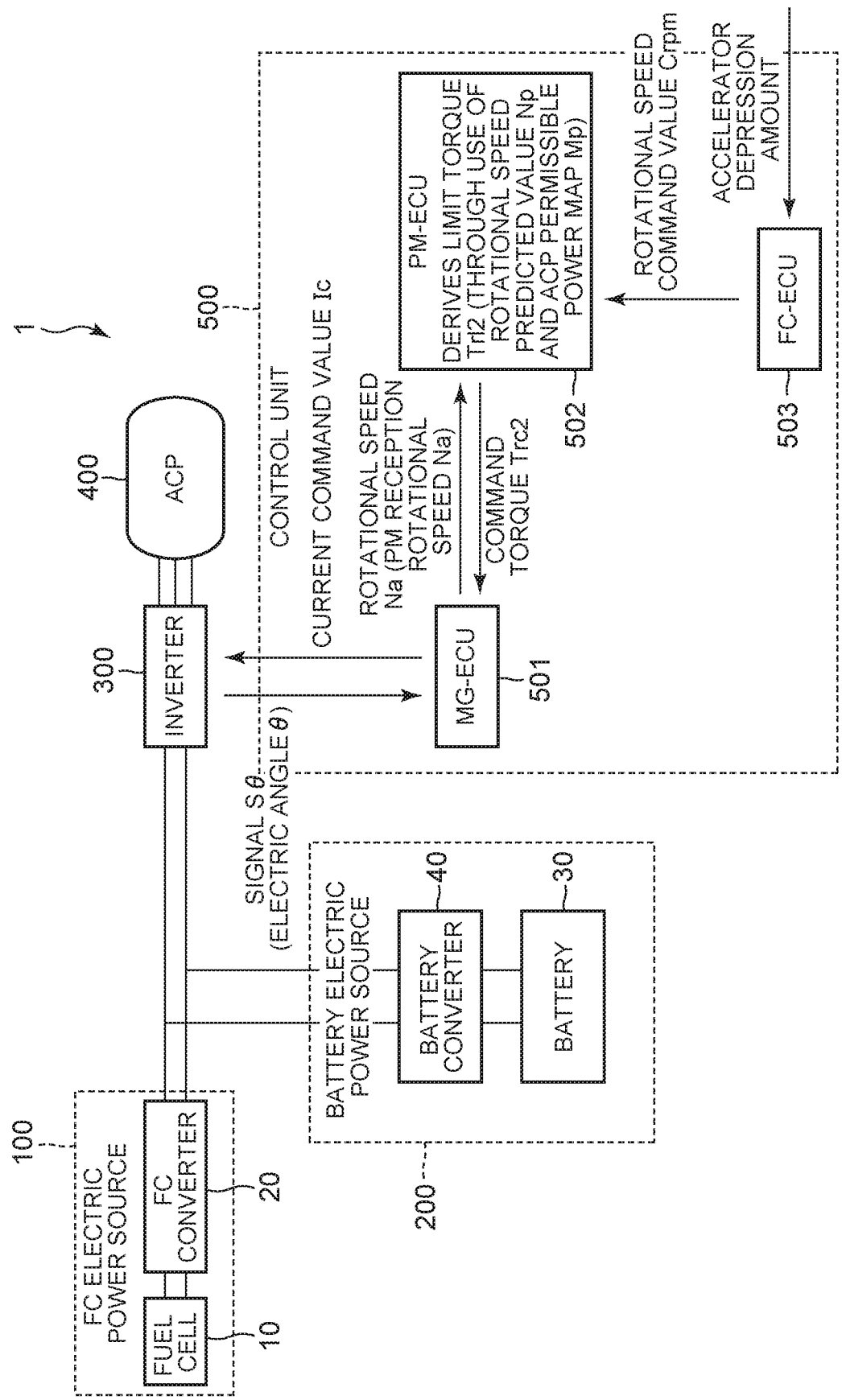
FIG. 1 is a view showing the general configuration of a fuel cell system 1 according to the present embodiment of the disclosure.
Figure 5:
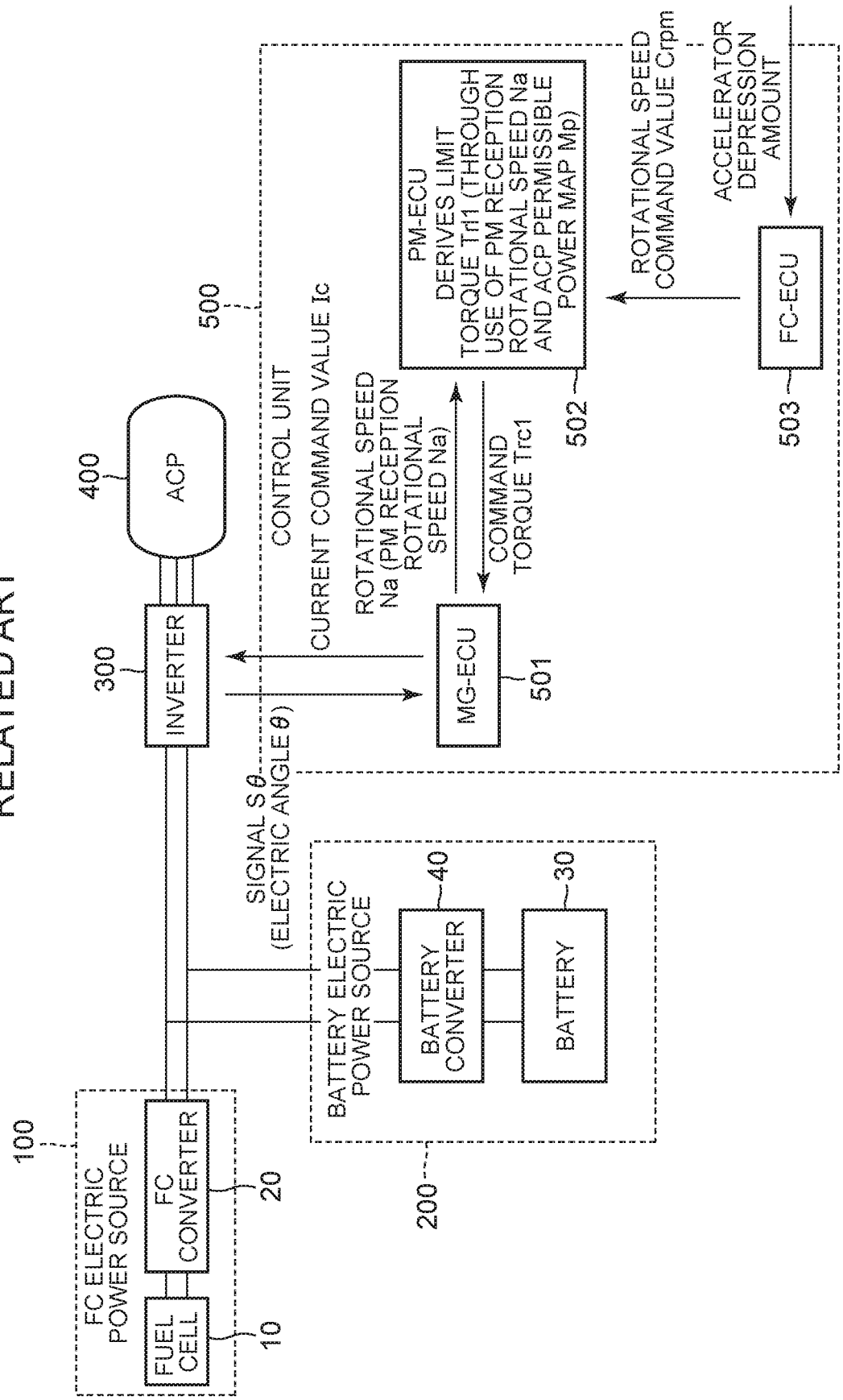
FIG. 5 is a view for illustrating a method of adjusting an amount of air by an ACP according to the related art.
Figure 6:
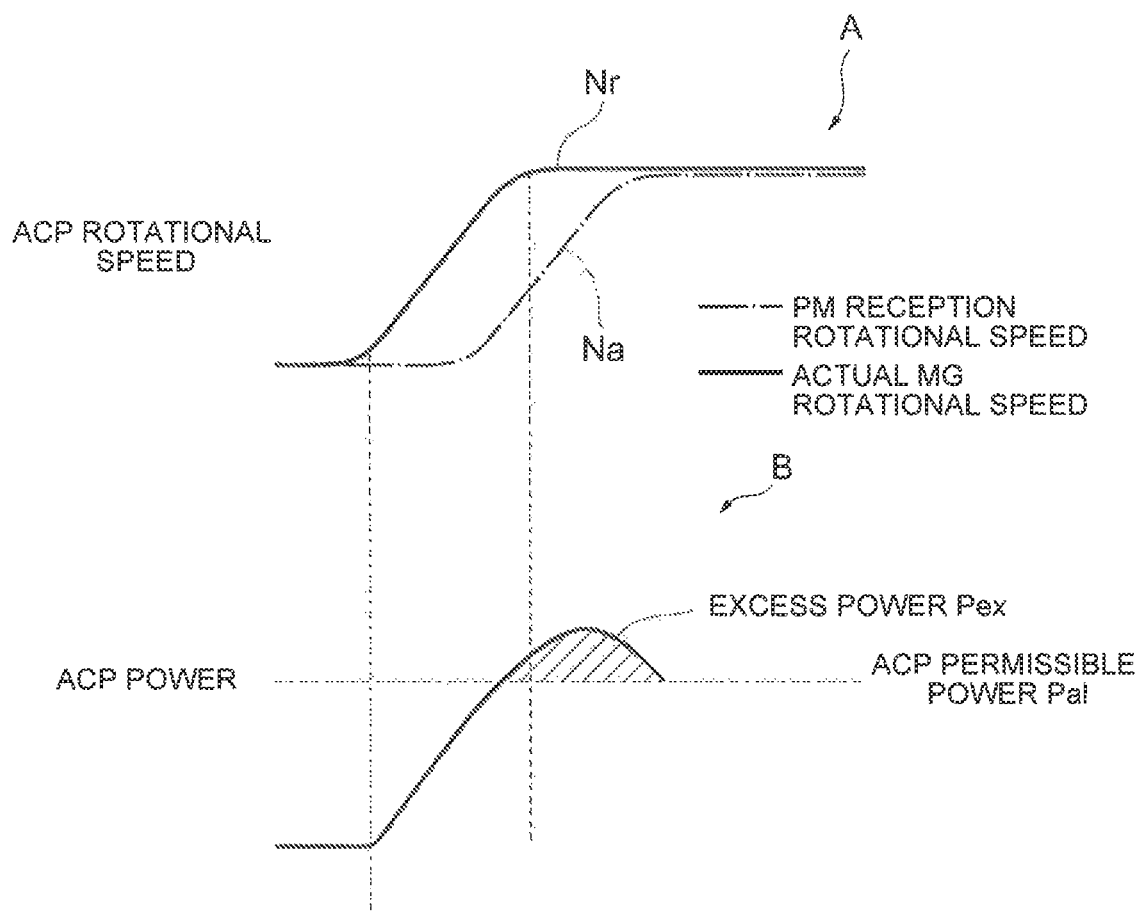
FIG. 6 is a view exemplifying a relationship between the ACP rotational speed and an ACP power.

FIG. 1 is a view showing the general configuration of the fuel cell system 1 that is mounted in a vehicle according to the present embodiment of the disclosure. Incidentally, the following description assumes that the fuel cell system 1 is applied to a fuel cell-powered (a fuel cell hybrid vehicle or an FCHV). However, the fuel cell system 1 is applicable to all systems that are mounted with a fuel cell, such as various movable bodies (e.g., ships, airplanes, robots and the like), stationary electric power sources and the like as well as vehicles. Besides, for the sake of easy understanding of the description, components in FIG. 1 corresponding to those of FIG. 5 are denoted by the same reference symbols respectively.

The fuel cell 10 constituting the FC electric power source 100 is configured to include a solid polyelectrolyte-type cell stack that is obtained by stacking single batteries, which are each equipped with an anode, a cathode and an electrolyte, in series. In the fuel cell 10, at the time of normal electric generation, an oxidation reaction according to a formula (1) occurs at the anode, and a reduction reaction according to a formula (2) occurs at the cathode. An electrogenic reaction according to a formula (3) occurs in the fuel cell 10 as a whole, so an electric power is generated.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \qquad (3)$$

The FC converter 20 is a DCDC converter that is connected to the fuel cell 10. The FC converter 20 steps up an output voltage (an FC voltage) from the fuel cell 10 to a desired voltage (e.g., 650 V), and supplies the stepped-up voltage to the ACP 400 and the like via the inverter 300 and the like. The FC converter 20 is constituted by, for example, an intelligent power module (an IPM) or the like.

The battery 30 constituting the battery electric power source 200 is a rechargeable electric storage unit. The battery 30 is constituted by, for example, a lithium-ion battery, a nickel hydride battery or the like.

The battery converter 40 is interposed between the battery 30 and the inverter 300. The battery converter 40 serves to step up an output voltage of the battery 30 (a battery voltage) to the above-mentioned desired voltage (e.g., 650 V), and step down a voltage supplied from the FC electric power source 100 to the battery voltage. The battery converter 40 is constituted by, for example, an IPM or the like.

The fuel cell 10 and the battery 30 are connected in parallel to the inverter 300. In concrete terms, the inverter 300 is provided between the FC converter 20 and the battery converter 40 on the one hand and the ACP on the other hand. The inverter 300 converts a DC electric power supplied from the fuel cell 10 or the battery 30 into a three-phase AC electric power, and supplies the three-phase AC electric power to the ACP 400 and the like. The inverter 300 is constituted by, for example, an IPM. The ACP 400 supplies an appropriate amount of air to the fuel cell 10 in accordance with an electric generation requirement or the like.

The control unit 500 is equipped with a plurality of ECU's that are each constituted of a central processing unit (a CPU), a read only memory (a ROM), a random access memory (a RAM) and the like. In concrete terms, the control unit 500 is equipped with the MG-ECU (a first control unit) 501 that controls the driving of the ACP 400 and the like, the PM-ECU (a second control unit) 502 that controls the electric power of the system and the like, the FC-ECU (a third control unit) 503 that controls the electric generation of the fuel cell 10 and the like, etc.

As described previously, the system of FIG. 5 sets the limit torque Trl1 (see FIG. 5) through the direct use of the rotational speed (the PM reception rotational speed) Na of the ACP 400 delayed in communication (in other words, through the use of the rotational speed deviant from the actual MG rotational speed Nr) even when there is a delay in communication from the MG-ECU 501 to the PM-ECU 502. Therefore, the command torque Trc1 corresponding to the excess power Pex exceeding the ACP permissible power Pal is generated. In contrast, according to the present embodiment of the disclosure, the rotational speed (the PM reception rotational speed) Na of the ACP 400 delayed in communication is not directly used. Instead, the rotational speed (the actual MG rotational speed) Nr of the ACP 400 is predicted in the PM-ECU 502, and the limit torque Trl2 is set through the use of the predicted rotational speed (the rotational speed predicted value) Np. Thus, the command torque Trc2 is generated within such a range as not to exceed the ACP permissible power Pal, and the command torque Trc1 corresponding to the excess power Pex is thereby restrained from being generated. The characteristic processing flow of the present embodiment of the disclosure will be described hereinafter with reference to the drawings.

[Rotational Speed Prediction Process]

Figure 2:
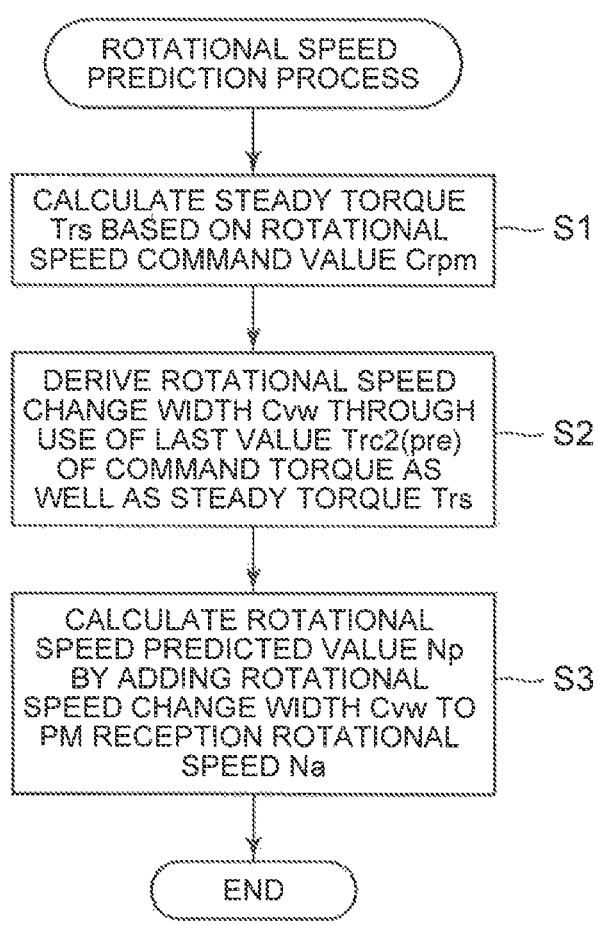
FIG. 2 is a flowchart showing a rotational speed prediction process.

FIG. 2 is a flowchart showing a rotational speed prediction process of the ACP 400 that is carried out by the PM-ECU 502. The PM-ECU 502 obtains a steady torque (in concrete terms, a torque needed to maintain a rotational speed at the moment) Trs, based on the rotational speed command value Crpm supplied from the FC-ECU 503 (step S1). Then, the PM-ECU 502 reads out a command torque transmitted to the MG-ECU 501 one cycle ago (i.e., a last value of the command torque) Trc2(pre) as well as the steady torque Trs from the RAM or the like, and obtains a rotational speed change width Cvw by subtracting the steady torque Trs from the last value Trc2(pre) of the command torque (step S2: see a formula (4) shown below).

$$Cvw = Trc2(\text{pre}) - Trs \qquad (4)$$

On the other hand, the MG-ECU 501 acquires the signal Sθ indicating the electric angle θ from the inverter 300, and obtains the rotational speed Na of the ACP 400 from a moving amount of the electric angle θ. Then, the MG-ECU 501 transmits the obtained rotational speed (the obtained PM reception rotational speed) Na of the ACP 400 to the PM-ECU 502 through communication. As described previously, a communication delay is caused in transmitting the PM reception rotational speed Na from the MG-ECU 501 to the PM-ECU 502. The PM-ECU 502 obtains the rotational speed predicted value Np by adding the above-mentioned rotational speed change width Cvw to the PM reception rotational speed Na received from the delayed MG-ECU 501 (step S3: see a formula (5) shown below). The MG-ECU 501 stores the obtained rotational speed predicted value Np into a storage unit such as the RAM or the like, and ends the process.

$$Np = Na + Cvw \qquad (5)$$

[Limit Torque Calculation Process]

Figure 3:
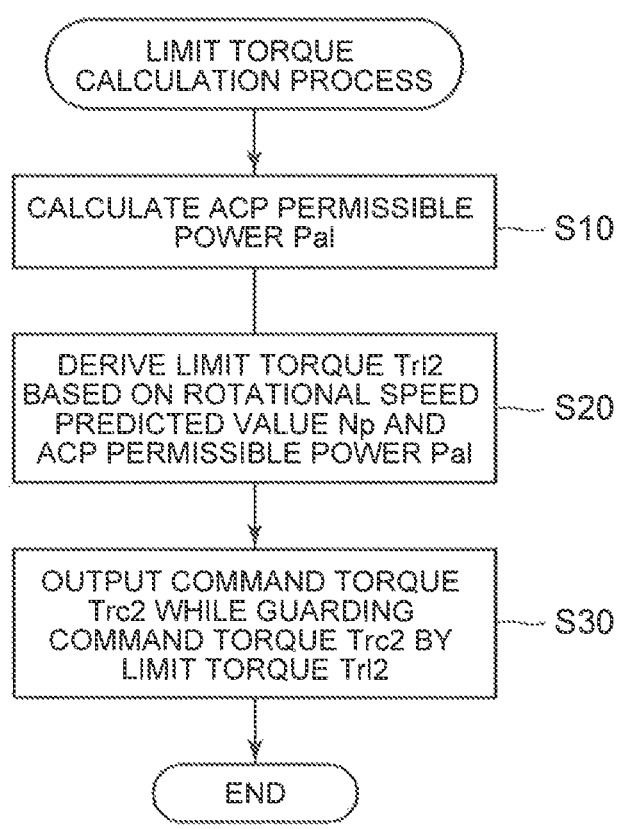
FIG. 3 is a flowchart showing a limit torque calculation process.

FIG. 3 is a flowchart showing a limit torque calculation process that is carried out by the PM-ECU 502. The PM-ECU 502 first calculates the ACP permissible power (a permissible electric power) Pal in consideration of an electric generation target power (an electric generation target electric power) of the fuel cell 10, an electric power loss caused in outputting a power, and the like (step S10). Then, the PM-ECU 502 reads out the rotational speed predicted value Np from the RAM or the like, and calculates the limit torque Trl2 based on the rotational speed predicted value Np thus read out and the ACP permissible power Pal (step S20). Then, the PM-ECU 502 outputs the calculated command torque Trc2 to the MG-ECU 501 while guarding the command torque Trc2 by the limit torque Trl2 such that the command torque Trc2 does not exceed the limit torque Trl2 (i.e., within a range of the limit torque Trl2) (step S30), and ends the process. The MG-ECU 501 calculates the current command value Ic based on the command torque Trc2, and supplies the calculated current command value Ic to the inverter 300. The inverter 300 controls the amount of oxygen supplied to the fuel cell 10, by driving the ACP 400 in accordance with the given current command value Ic.

Figure 4:
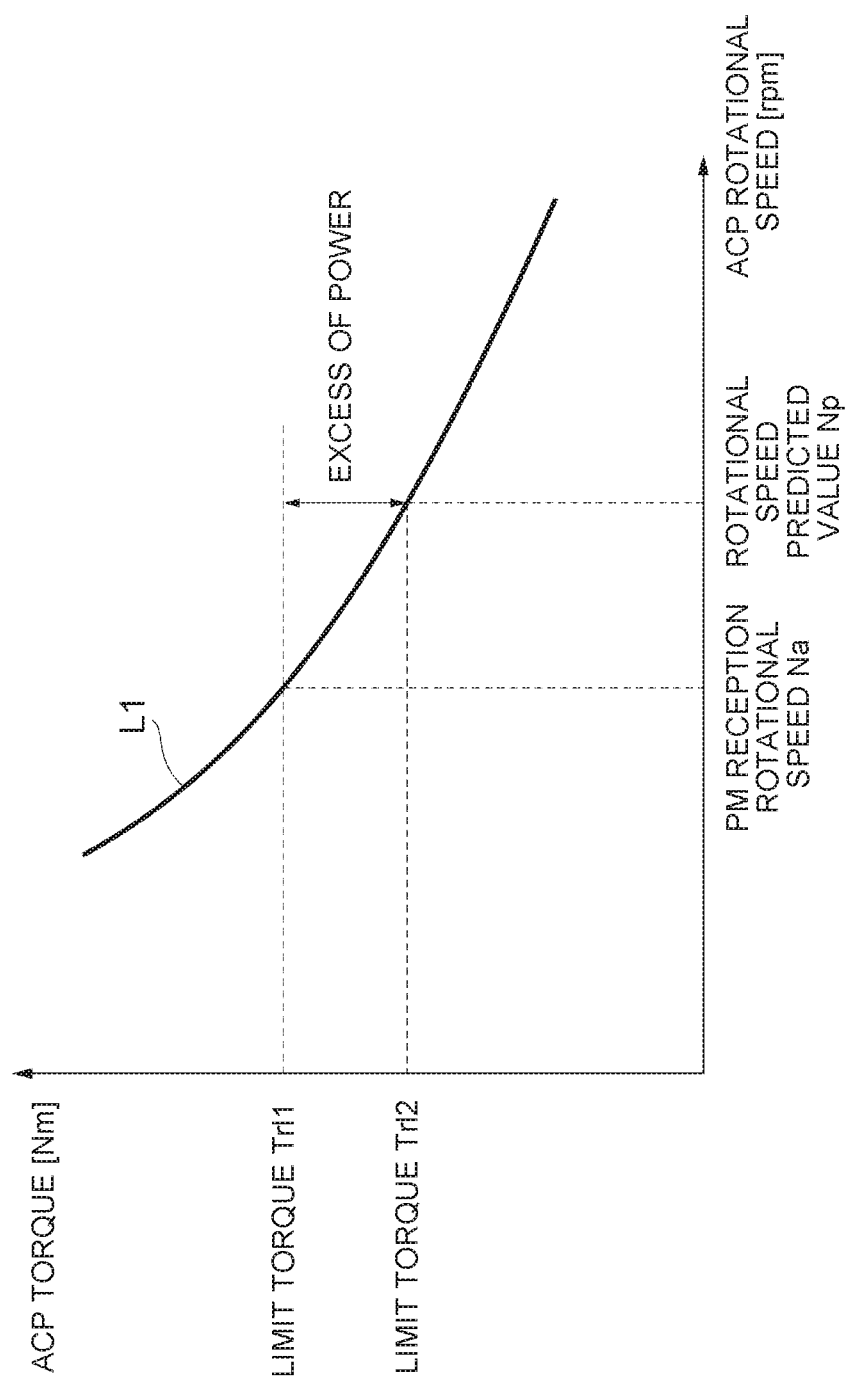
FIG. 4 is a view for illustrating a relationship among an ACP permissible power level line, an ACP rotational speed and an ACP torque.

It should be noted herein that FIG. 4 is a view for illustrating a relationship among the ACP permissible power level line L1, a rotational speed of the ACP 400 (an ACP rotational speed) and a torque of the ACP 400 (an ACP torque). The ACP permissible power level line L1 indicates a line on which the ACP permissible power Pal remains the same. As described above, upon reading out the rotational speed predicted value Np from the RAM or the like, the PM-ECU 502 according to the present embodiment of the disclosure obtains the limit torque Trl2 by, for example, assigning the rotational speed predicted value Np thus read out to the ACP permissible power level line L1.

On the other hand, in the system of FIG. 5 in which the rotational speed Na of the ACP 400 delayed in communication is directly used to obtain the limit torque Trl1, the limit torque Trl1, which is larger than the limit torque Trl2 in the present embodiment of the disclosure, is calculated. More specifically, as shown in FIG. 4, the rotational speed (the PM reception rotational speed) Na of the ACP 400 delayed in communication is lower than the rotational speed predicted value Np. In consequence, the limit torque Trl1 obtained by, for example, assigning the PM reception rotational speed Na to the ACP permissible power level line L1 is larger than the limit torque Trl2 obtained by, for example, assigning the rotational speed predicted value Np to the ACP permissible power level line L1, and the command torque Trc1 corresponding to a power exceeding the ACP permissible power Pal (an excess power) can be generated. That is, a power that does not fall within the ACP permissible power Pal is output due to the generation of the excessive command torque Trc1, and a surplus power is additionally supplied to the battery 30. As a result, a problem in that the battery 30 is overloaded may occur.

In contrast, according to the present embodiment of the disclosure, the rotational speed predicted value Np that is closer to the actual MG rotational speed Nr than in the system of FIG. 5 is obtained, and the limit torque Trl2 is obtained through the use of the obtained rotational speed predicted value Np and the ACP permissible power level line L1. Therefore, the command torque Trc2 corresponding to an appropriate power that falls within the ACP permissible power Pal can be generated.

Although the embodiment of the disclosure has been described above with reference to the drawings, the scope of the disclosure is not limited to this embodiment thereof. Those skilled in the art would obviously be able to conceive of various modification examples or correction examples, which also pertain to the technical scope of the disclosure as a matter of course.

B. Modification Examples

The following modification examples can be applied to the aforementioned embodiment of the disclosure. For example, the control unit 500 is configured to include the MG-ECU 501, the PM-ECU 502 and the FC-ECU 503. However, any configuration is acceptable as long as the MG-ECU 501 and the PM-ECU 502 communicate with each other (i.e., as long as the MG-ECU 501 and the PM-ECU 502 are configured separately from each other). For example, the function of the FC-ECU 503 may be incorporated into the PM-ECU 502. Besides, the function of each of the ECU's may be realized by a single ECU, but may also be realized by a plurality of ECU's.

What is claimed is:

1. A fuel cell system comprising:
   a fuel cell;
   a battery;
   an inverter to which the fuel cell and the battery are connected in parallel;
   an air compressor that is connected to the inverter; and
   a control unit programmed to control driving of the air compressor by a current command value supplied to the inverter, wherein
   the control unit is equipped with a first control unit programmed to control driving of the air compressor, and a second control unit programmed to control an electric power of the system,
   the first control unit is programmed to obtain a rotational speed of the air compressor based on a signal supplied from the inverter, transmit the rotational speed to the second control unit, and control the current command value supplied to the inverter based on a command torque transmitted from the second control unit, and
   the second control unit is programmed to receive the rotational speed from the first control unit, receive a rotational speed command value of the air compressor corresponding to an output requirement of the fuel cell from a device outside the second control unit, obtain a rotational speed predicted value based on the received rotational speed command value, derive a limit torque of the air compressor from the obtained rotational speed predicted value, generate the command torque of the air compressor within a range of the derived limit torque, and transmit the generated command torque to the first control unit.

2. The fuel cell system according to claim 1, wherein the second control unit is programmed to calculate a permissible electric power of the air compressor based on an electric generation target electric power of the fuel cell, and derive the limit torque based on the rotational speed predicted value and the permissible electric power of the air compressor.

3. The fuel cell system according to claim 1, wherein the second control unit is programmed to calculate a steady torque based on the rotational speed command value, derive a rotational speed change width through use of the calculated steady torque and a last value of the command torque transmitted to the first control unit one cycle ago, and obtain the rotational speed predicted value by adding the rotational speed to the derived rotational speed change width.

4. The fuel cell system according to claim 1, further comprising:
   a third control unit programmed to control electric generation of the fuel cell, wherein
   the third control unit is the device outside the second control unit, the third control unit is programmed to obtain the output requirement of the fuel cell based on a signal indicating an input accelerator depression amount, generate the rotational speed command value of the air compressor in accordance with the obtained output requirement, and transmit the generated rotational speed command value to the second control unit.

* * * * *